Feb. 28, 1933.    L. B. GRUMAN    1,899,030
LIQUID STRAINING DEVICE
Filed Aug. 27, 1930
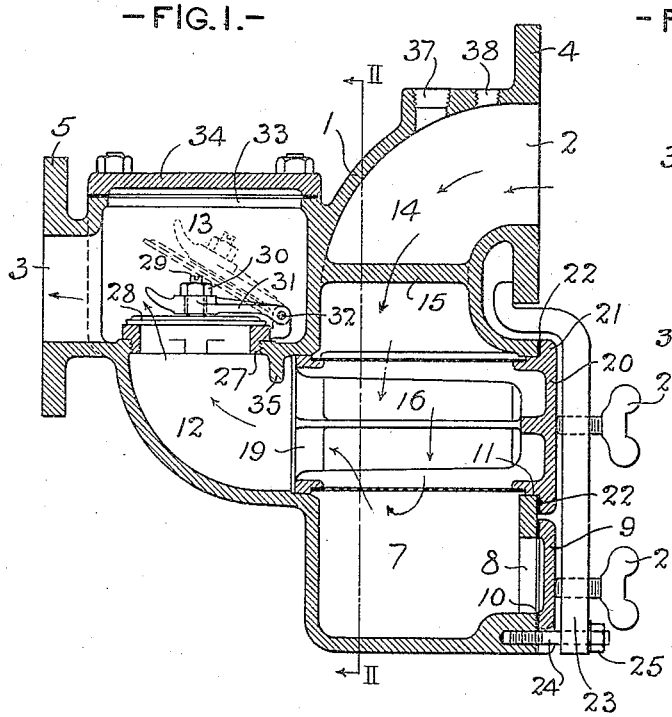
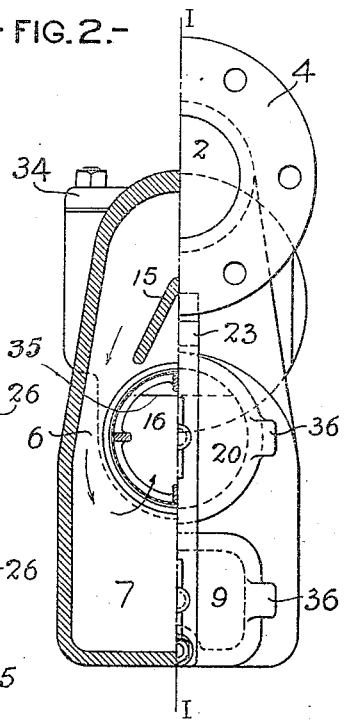
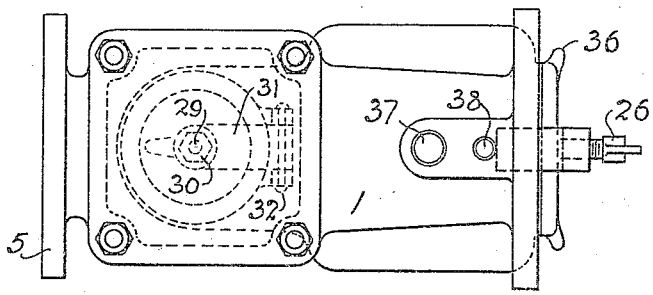
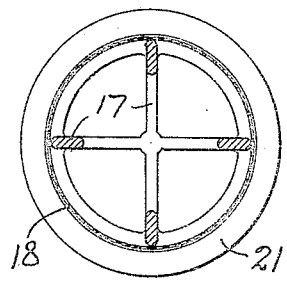
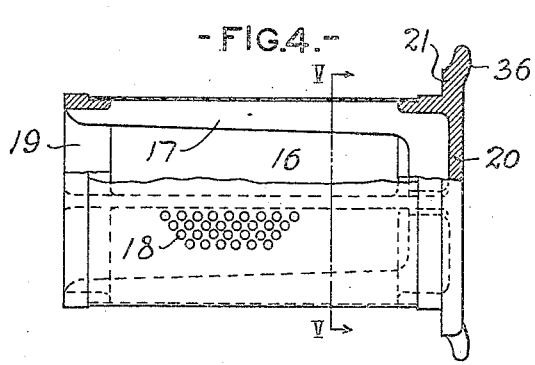
INVENTOR
*Lloyd B. Gruman.*
BY
*S C Yeaton*
ATTORNEY Patented Feb. 28, 1933

1,899,030

UNITED STATES PATENT OFFICE

LLOYD B. GRUMAN, OF HILLSIDE, NEW JERSEY, ASSIGNOR TO AMES PUMP COMPANY, INC., OF NEW YORK, N. Y., A CORPORATION OF NEW YORK

LIQUID STRAINING DEVICE

Application filed August 27, 1930. Serial No. 478,029.

This invention relates to apparatus for straining liquids and particularly to a strainer of water, such as is used in vacuum heating systems. As is well known in the heating art, where water and vapors are circulated through the system, a certain amount of dirt and foreign solid matter is collected, and in order to insure the maximum efficiency of operation, it is necessary to remove such undesirable foreign matter. For this purpose strainers are employed in the systems. Such strainers are usually disposed between a pump and the return pipe of the system, and the water and vapors are sucked through the strainers by a vacuum, produced by the pump. Heretofore strainers have been employed which embodied strainer baskets so disposed as to be entirely submerged in water, and to necessitate the drawing of the vapors through water or through a restricted space in order to carry them from the return pipe of the system through the strainer. At a substantial period of time, during the operation of such heating systems, vapors alone are being pumped through the strainer. The necessity of drawing the vapors through the strainer in this manner effects a differential of vacuums at the opposite sides of the strainer, that is to say when the pump is working so as to produce a certain vacuum at the pump side of the strainer, a lesser vacuum is effected at the opposite side, the efficiency of the system being thus reduced, or in other words unnecessary work is required of the pump. This differential in vacuums and loss of efficiency, while apparently small, if considered over a long period of time, constitutes a very substantial loss.

An object of the present invention is to provide a strainer so constructed as to permit the free passage of vapors therethrough and to avoid the loss occasioned by the aforesaid differential of vacuums.

A further object of the invention is the provision of a strainer of the character described which is simple in construction, composed of few parts, comparatively inexpensive in cost of manufacture, easily operated and efficient in results. To the attainment of these objects, the invention consists in the features of novelty as exemplified in the construction, combination and arrangement of the several parts hereinafter fully described and claimed and illustrated in the accompanying drawing, in which:

Figure 1 is a sectional side view of a strainer embodying the present invention taken on the line I—I of Fig. 2; Fig. 2 on the right side is an end elevation of the strainer, and on the left side is a section on the line II—II of Fig. 1; Fig. 3 is a plan view of the strainer; Fig. 4 is an enlarged view of the strainer basket partly in section; and Fig. 5 is a section on the line V—V of Fig. 4.

Referring more particularly to the drawing, the casing for the strainer, which is preferably formed of a casting, is designated by the numeral 1. An inlet port 2 and an outlet port 3 are provided in opposite ends on the upper part of the casing, and flanges 4 and 5 are formed around the peripheries of the respective ports, adapting them for connection with adjacent pipes of the system (not shown). A chamber 6 is formed in the casing, having a lower portion or pocket 7, adapted for the reception of sediment, sludge or other material strained from the liquid. An opening 8 is provided in the casing at the end of the sediment pocket 7 and a removable cover 9 is positioned over the opening, a gasket 10 of suitable material being disposed between the cover 9 and the outer wall of the opening, to prevent leakage. An opening 11 is formed in the wall of the chamber 6 above the opening 8 for a purpose hereinafter set forth, and the casing wall opposite the opening 11 is formed so as to provide an annular passage 12 leading to the chamber 13 formed in the upper part of the casing, in the outer end of which chamber the outlet port 3 is formed. The casing walls above the chamber 6 are formed with an annular passage 14 leading from the inlet port 2. A deflector 15 comprising an inverted V-shape baffle plate, is formed longitudinally in the lower part of the passage 14.

A strainer basket 16 (Figs. 4 and 5) is disposed in the upper part of the chamber 6 adapted to be inserted and removed through the opening 11 in the end of the casing. The strainer basket is constructed of a frame 17 comprising horizontal rib members around which is mounted the cylindrical screen 18. The strainer basket is closed at its outer end by the cover plate 20 which has an extended peripheral flange 21 adapted to be held against the end of the casing, said cover serving to close the opening 11. The inner end 19 of the strainer basket is open and its outer periphery at said opening engages the walls of the passage 12 so that all of the fluid which passes from the chamber 6 into the passage 12 must pass through the strainer screen 18. In the preferred embodiment of the invention, as illustrated, the effective open area in the screen 18, by reason of the size and shape of the strainer, will be at least as great as the inlet port 2 so that there will be substantially no decrease in the rate of flow of fluid caused by its passage through the strainer. A gasket 22, of suitable material, is interposed between the flange 21 and the outer wall of the opening 11 to prevent leakage.

A locking bar 23, is loosely connected at one end by a stud 24 screwed into the casing wall and provided with the nut 25. The opposite end of the bar is shaped so as to pass under the flange 4 and rest on the inner side of same. The locking bar 23 passes over the sediment pocket cover 9 and the strainer basket cover plate 20, and thumb screws 26 are provided in the locking bar opposite the center of the cover 9 and plate 20, and are adapted to be screwed against the same to lock them in closed position. A valve seat 27 is removably secured in the casing 1 at the bottom of the chamber 13, and a valve disk 28 is disposed above the same so as to open in the direction of the flow of the liquid. A shank 29 integrally formed on the top of the valve disk is held by the nut 30, in the arm 31 which is pivotally connected to the valve seat 27 by a pin 32. The shank 29 is held loosely in the arm 31 so that the disk 28 may close on the seat 27 so as to effect an air tight connection when in closed position. The upper end of the shank 29 is slotted to receive a screwdriver whereby the disk may be rotated on the seat when it is desired to clean or grind the same. An opening 33 is provided in the casing wall above the valve and a cover plate 34 is removably secured over the opening, for insertion and removal of the valve and seat and so that they will be readily accessible for cleaning or repair. On the wall of the casing above the passage 12, a lip 35 is extended downward adjacent the upper part of the open end of the strainer basket.

A partition, provided by the solid wall, terminating in the lower edge of the lip 35, and the strainer basket, divides the interior of the casing into two parts, completely enclosing one part which contains the outlet port 3, from the other part which contains the inlet port 2 against the passage of the solid matter, while permitting liquids, vapors and gases to pass through the casing from one part to the other. The lip is provided with a straight horizontal lower edge beneath and transversely of which the liquids, vapors and gases move in passing from the inlet port of the casing to the outlet port.

The strainer basket provides a substantially horizontal hollow part of the partition, which is disposed between the upper portion of the inlet part and the lower solid matter-receiving portion thereof, or pocket 7. The strainer thus provides a hollow part, at least a part of which is formed as a screen disposed at least as high as the lower edge of the lip 35, and the screen provides sufficient open area for the free passage of gases and vapors therethrough to the outlet opening 3. The strainer basket or hollow part extending, as aforesaid, across the chamber 6, is of such size relative to the casing that the inlet part of the casing is provided with portions or passageways extending across, i. e. vertically at the sides of, the hollow part, which passageways connect the upper portion of the inlet part with the solid matter-receiving portion of pocket 7, for the passage of solid matter.

In the operation of the strainer, the liquid upon entering the strainer through the port 2 will flow through the passage 14 and be divided by the deflector 15 so as to flow down into the chamber 6 around the sides of the strainer basket 16. Passing through the screen 18 the fluid will be strained thereby, and any sediment, sludge or foreign matter will be deposited in the pocket 7. The strained liquid will then flow out through the open end 19 of the strainer basket through the passage 12, and through the check valve, to the outlet port 3. The valve disk 28 will open and close in the usual manner to permit the outward flow and to prevent the strained liquid from flowing back into the passage 12. The lip 35 being extended from the wall of the casing as described, permits liquid to be removed through the passage 12 while the liquid within the chamber 6 is being maintained at a level sufficiently low to allow an air space above the strainer basket. It will thus be apparent that when vapors are being drawn through the strainer it is not necessary to draw the same through the liquid or through a restricted space, but they will pass through the upper portion of the strainer basket, which is above the liquid level, and will then pass beneath the lower edge of the lip, 35, which, presenting a line of substantial length adjacent the end of the strainer basket, thereby permits the free passage of vapors through the strainer. By this construction the differential of vacuums, or sub-pressures, occasioned by former strainer construction is avoided, and the waste or inefficiency of requiring the pump of the system to do unnecessary work in drawing the vapors through a restricted area in the strainer is eliminated, thereby making for a more efficient device. Cover 9 and the strainer basket 16 may be conveniently removed for cleaning or repair upon loosening the thumb screws 26 and swinging the bar 23 to either side. For convenience in handling, ears 36 may be formed on the cover plates 9 and 20. To permit the introduction into the strainer of any other substance which may be desired in addition to the fluid flowing through the port 2, the ports 37 and 38 are formed in the casing wall in the upper part of the passage 14. Suitable plugs (not shown) may be screwed into the ports to close the same when they are not in use.

The simplicity of construction and durability and efficiency of this apparatus constitute marked desirable features over devices of the prior art. It will be understood that all such changes in the details of construction of the aforedescribed embodiment of this invention, as may be desirable and apparent to those skilled in the art, are contemplated as a part of this invention, within the scope of the appended claims.

The invention claimed and desired to be secured by Letters Patent is:

1. A device for straining solid matter from liquids and for the passage of liquids, vapors and gases therethrough, comprising a chamber; and a partition dividing the chamber into two parts and completely enclosing one part from the other part against the passage of said solid matter, but permitting liquids, vapors and gases to pass therethrough from one part to the other part, one of the parts containing an inlet at its upper portion and a portion at its lower end for the reception of solid matter entering the inlet, and the other part containing an outlet for the passage of the liquids, vapors and gases entering the inlet, after being freed from the solid matter, said partition comprising a solid part extending from the top of the chamber downwardly and terminating in a straight horizontal lower edge beneath and transversely of which the fluids move in passing from the inlet part of the chamber to the outlet part, said outlet being disposed at least as high as said lower edge, and a substantially horizontal hollow part disposed between said upper and solid matter receiving portions and having an end adjacent said lower edge, said hollow part being formed at least in part of a screen disposed at least as high as said lower edge with sufficient open area for the free passage of gases and vapors therethrough, and said inlet part having a portion extending across said hollow part connecting the upper portion of said inlet part with the solid matter receiving portion.

2. A device for straining solid matter from liquids and for the passage of liquids, vapors and gases therethrough, comprising a chamber; a partition dividing the chamber into two parts and completely enclosing one part from the other part against the passage of said solid matter, but permitting liquids, vapors and gases to pass therethrough from one part to the other part, one of the parts containing an inlet at its upper portion and a portion at its lower end for the reception of solid matter entering the inlet, and the other part containing an outlet for the passage of the liquids, vapors and gases entering the inlet, after being freed from the solid matter, said partition comprising a solid part extending from the top of the chamber downwardly and terminating in a straight horizontal lower edge beneath and transversely of which the fluids move in passing from the inlet part of the chamber to the outlet part, said outlet being disclosed at least as high as said lower edge, and a substantially horizontal hollow part disposed between said upper and solid matter receiving portions and having an end adjacent said lower edge, said hollow part being formed at least in part of a screen disposed at least as high as said lower edge with sufficient open area for the free passage of gases and vapors therethrough, and said inlet part having a portion extending across said hollow part connecting the upper portion of said inlet part with the solid matter receiving portion; and a baffle above the screen to protect and maintain the screen opposite the baffle substantially free from solid matter to facilitate the free passage of gases and vapors therethrough.

3. A device for straining solid matter from liquids and for the passage of liquids, vapors and gases therethrough, comprising a chamber; and a partition dividing the chamber into two parts and completely enclosing one part from the other part against the passage of said solid matter, but permitting liquids, vapors and gases to pass therethrough from one part to the other part, one of the parts containing an inlet at its upper portion and a portion at its lower end for the reception of solid matter entering the inlet, and the other part containing an outlet for the passage of the liquids, vapors and gases entering the inlet, after being freed from the solid matter, said partition comprising a solid part extending from the top of the chamber downwardly and terminating in a straight horizontal lower edge beneath and transversely of which the fluids move in passing from the inlet part of the chamber to the outlet part, said outlet being disposed at least as high as said lower edge, and a substantially horizontal hollow part disposed between said upper and solid matter receiving portions and having an end adjacent said lower edge, said hollow part being formed at least in part of a screen projecting upwardly above said lower edge with sufficient open area above said lower edge for the free passage of gases and vapors therethrough, and said inlet part having a portion extending across said hollow part connecting the upper portion of the inlet part with the solid matter receiving portion.

4. A device for straining solid matter from liquids and for the passage of liquids, vapors and gases therethrough, comprising a chamber; and a partition dividing the chamber into two parts and completely enclosing one part from the other part against the passage of said solid matter, but permitting liquids, vapors and gases to pass therethrough from one part to the other part, one of the parts containing an inlet at its upper portion and a portion at its lower end for the reception of solid matter entering the inlet, and the other part containing an outlet for the passage of the liquids, vapors and gases entering the inlet, after being freed from the solid matter, said partition comprising a solid part extending from the top of the chamber downwardly and terminating in a straight horizontal lower edge beneath and transversely of which the fluids move in passing from the inlet part of the chamber to the outlet part, said outlet being disposed at least as high as said lower edge, and a substantially horizontal hollow part disposed between said upper and solid matter receiving portions and having an end adjacent said lower edge, said hollow part being formed at least in part of a screen having a downwardly and outwardly extending portion above the said lower edge with sufficient open area for the free passage of gases and vapors therethrough, and said inlet part having a portion extending across said hollow part connecting the upper portion of the inlet part with the solid matter receiving portion.

LLOYD B. GRUMAN.